United States Patent [19]
Boice

[11] Patent Number: 5,298,302
[45] Date of Patent: Mar. 29, 1994

[54] FILM WITH IMPROVED LAP SEAL

[75] Inventor: Peter R. Boice, Taylors, S.C.

[73] Assignee: W. R. Grace & Co.-Conn., Duncan, S.C.

[21] Appl. No.: 935,696

[22] Filed: Aug. 21, 1992

[51] Int. Cl.$^5$ .............................................. B65B 53/00
[52] U.S. Cl. ................................... 428/34.9; 428/349; 428/516; 428/910
[58] Field of Search ...................... 428/516, 349, 34.9, 428/910

[56] References Cited
U.S. PATENT DOCUMENTS 4,194,039  3/1980  Mueller ................................ 428/213

FOREIGN PATENT DOCUMENTS 2115348  2/1983  United Kingdom .

*Primary Examiner*—Edith Buffalow
*Attorney, Agent, or Firm*—Mark B. Quatt

[57] ABSTRACT

A multilayered thermoplastic film having improved lap seal strength includes skin layers having blends of ethylene propylene copolymer with polybutylene or propylene butene copolymer, or propylene butene copolymer. Oriented shrink films can beneficially be made from three and five layer formulations including such skin layer compositions.

9 Claims, 1 Drawing Sheet

FILM WITH IMPROVED LAP SEAL

FIELD OF THE INVENTION

This invention relates to thermoplastic film, and in particular to heat shrinkable, thermoplastic packaging films having improved lap seals. The present invention is directed especially to shrink films utilizing blends of ethylene propylene copolymer and polybutylene or propylene butene copolymer resins, or alternatively propylene butene copolymer, as a constituent of outer layers in a multilayer packaging film.

BACKGROUND OF THE INVENTION

The present invention is directed to new and useful films, and especially heat shrinkable films. One distinguishing feature of a shrink film is the film's ability, upon exposure to a certain temperature, to shrink or, if restrained from shrinking, to generate shrink tension within the film.

The manufacture of shrink films, as is well known in the art, may be generally accomplished by extrusion of the resinous materials which have been heated to their flow or melting point from an extrusion die in tubular or planar form. After a post extrusion quenching to cool, the extrudate is then reheated to its orientation temperatures range. The orientation temperature range for a given film will vary with the different resinous polymers and blends thereof which comprise the film. However, the orientation temperature range may generally be stated to be above room temperature and below the melting point of the film.

The terms "oriented" or "orientation" are used herein to describe the process and resultant product characteristics obtained by stretching and immediately cooling a resinous polymeric material which has been heated to its orientation temperature range so as to revise the molecular configuration of the material by physical alignment of the molecules to improve mechanical properties of the film such as, for example, shrink tension and orientation release stress. Both of these properties may be measured in accordance with ASTM D 2838-69 (reapproved 1975). When the stretching force is applied in one direction uniaxial orientation results. When the stretching force is applied in two directions biaxial orientation results. Orientation is also herein used interchangeably with "heat shrinkability" with these terms designating a material which has been stretched and set by cooling at its stretched dimensions. An oriented (i.e., heat shrinkable) material will tend to return to its original unstretched dimensions when heated to an appropriate temperature below its melting temperature range.

The term "lap seal strength" is used herein to mean the strength of the film of the present invention when sealed to itself, primarily assisted only by the weight of the product which is being packaged. Typically, shrink tunnel heat is employed to create the lap seal. This is to be contrasted to "heat seal strength" referring typically to conventional heat seals created by the pressure of e.g. an impulse sealer. Typically, seal bar heat is employed to create the heat seal.

Returning to the basic process for manufacturing the film as discussed above, it can be seen that the film once extruded and initially quenched to cool is then reheated to its orientation temperature range and oriented. The stretching to orient may be accomplished in many ways such as, for example, by "blown bubble" techniques or "tenter framing". These terms are well known to those in the art and refer to orientation steps whereby the material is stretched in the cross or transverse direction (TD) and in the longitudinal or machine direction (MD). After being stretched, the film is rapidly cooled to quench and thus set or lock-in the oriented molecular configuration.

After locking-in the oriented molecular configuration the film may then be stored in rolls and utilized to tightly package a variety of items. In this regard, the product to be packaged its first enclosed in the heat shrinkable material by heat sealing the shrink film to itself where necessary. Thereafter, the enclosed product is subjected to elevated temperatures by, for example, passing the product through a hot air or hot water tunnel. This causes the film to shrink around the product (also inducing creation of the lap seal) to produce a tight wrapping that closely conforms to the contour of the product.

The above general outline for manufacturing films is not meant to be all inclusive since this process is well known to those in the art. For example, see U.S. Pat. Nos. 4,274,900; 4,229,241; 4,194,039; 4,188,443; 4,048,428; 3,821,182 and 3,022,543. The disclosures of these patents are hereby incorporated by reference.

Many variations on the above discussed general processing theme are available to those in the art depending upon the end use for which the film is to be put and the characteristics desired to be instilled in the film. For example, the molecules of the film may be cross-linked during processing to improve the films abuse resistance and other characteristics. Cross-linking and methods for cross-linking are well known in the art. Cross-linking may be accomplished by irradiating the film or, alternatively, may be accomplished chemically through the utilization of e.g. peroxides. Another possible processing variation is the application of a fine mist of silicone spray to the interior of the freshly extruded material to improve the further processability of the material.

In packaging applications involving the application of a heat seal to close a package, a film with high shrink tension can sometimes undergo seal failure or weakening during a subsequent heat shrinking step. Where the seal is a lap seal, e.g. an overlap of film typically on the underside of a package, seal failure can result in loss, damage, or contamination of the packaged product.

The inventor has discovered that the lap seal strength of certain packaging films can be significantly improved by using a blend of ethylene propylene copolymer and polybutylene in the outer layers of such films.

Alternatively, the lap seal strength of certain packaging films can be significantly improved by using a blend of ethylene propylene copolymer and propylene butene copolymer in the outer layers of such films.

Films having outer layers comprising propylene butene copolymer are also beneficial.

OBJECTS OF THE INVENTION

An object of the present invention is to provide a film, especially a shrink film, which has stronger lap seals.

DEFINITIONS

Unless specifically set forth and defined or limited, the terms "polymer" or "polymer resin" as used herein generally include homopolymers, copolymers, terpolymers, block, graft polymers, random, and alternating polymers.

The term "core" or "core layer" as used herein means a layer in a multilayer film which is enclosed on both sides by additional layers.

The term "skin" or "skin layer" as used herein means an outer (i.e., surface) layer of a multilayer film.

The term "intermediate" or "intermediate layers" as used herein means a layer of a multilayer film which is not a skin layer, and typically is an adhesive layer for bonding a core layer to a skin layer.

The term "linear low density polyethylene" (LLDPE) as used herein refers to a copolymer of ethylene and 8% or less of butene, octene or hexene having a density of from 0.910 to 0.925 and in which the molecules comprise long chains with few or no branches or cross-linked structures.

The term "linear medium density polyethylene" (LMDPE) as used herein refers to a copolymer of ethylene and less than 8% butene, octene or hexene having a density of from 0.926 to 0.940 and in which the molecules comprise long chains with few or no branches or cross-linked structures.

The term "polybutylene" (PB) as used herein refers to a thermoplastic resin, typically semicrystalline, based on butene-1.

The term "linear ethylene alpha olefin copolymer" (linear EAO) is used herein to refer to LLDPE, LMDPE, very low density polyethylene, and similar copolymers with a significant degree of linearity. Typical alpha olefins are $C_4$ through $C_8$ comonomers.

The term "propylene butene copolymer" (PBC) as used herein refers to a thermoplastic resin formed from butene and propylene monomers wherein the propylene derived units are present as a major constituent, and the butene derived units are present as a minor constituent.

The term "ethylene propylene copolymer" (EPC) as used herein refers to a copolymer formed from ethylene and propylene monomers wherein the propylene derived units are present as a major constituent and the ethylene derived units are present as a minor constituent.

The term "propylene homopolymer" (PP) as used herein refers to a thermoplastic resin having a density of approximately 0.90 and made by polymerizing propylene with suitable catalysts as is well known in the art.

SUMMARY OF THE INVENTION

It has been discovered that a flexible thermoplastic packaging film having a desirable lap seal strength has been achieved by the multilayer flexible, thermoplastic packaging film of the present invention. This multilayer film has a "core" layer that comprises a linear ethylene alpha olefin copolymer such as preferably linear low density polyethylene. Linear medium density polyethylene, very low density polyethylene, and propylene polymer or copolymer can also be used in the core layer. A preferred three layer embodiment also comprises, in addition to the above identified "core" layer, two skin layers each comprising a blend of an ethylene propylene copolymer and a polybutylene. Preferably, the multilayer film is oriented so that it is heat shrinkable in at least one direction.

The multilayer film may be combined with other polymeric materials for specific applications. For instance, relatively thin layers may be added on either or both sides of the basic preferred three layer structure, or within the structure, to improve seal strength or to lower gas or moisture permeability.

Another embodiment of the present invention envisions a five layered film structure. A preferred five layer structure comprises the same core and skin layers as the above discussed three layer structure and additionally includes two intermediate layers each comprising a low ethylene content propylene copolymer, or other polymeric material which can adequately adhere the skin layers to the core layer. Various polymeric adhesives are available which can function as the intermediate layers; some of these include carboxylic acid or acid anhydride moieties. Linear EAO is a suitable material.

In still other alternative embodiments, three and five layer film structures like those described above, but having a blend of EPC and propylene butene copolymer (PBC) in the skin layer can also be used beneficially in packaging applications.

Finally, a film comprising skin layers of PBC is also an alternative construction of benefit in the packaging field.

BRIEF DESCRIPTION OF THE DRAWINGS

FIG. I is a cross sectional view of a preferred three layered embodiment of the present invention.

FIG. II is a cross sectional view of a preferred five layered embodiment of the present invention.

DESCRIPTION OF THE PREFERRED EMBODIMENTS

Figure 1:
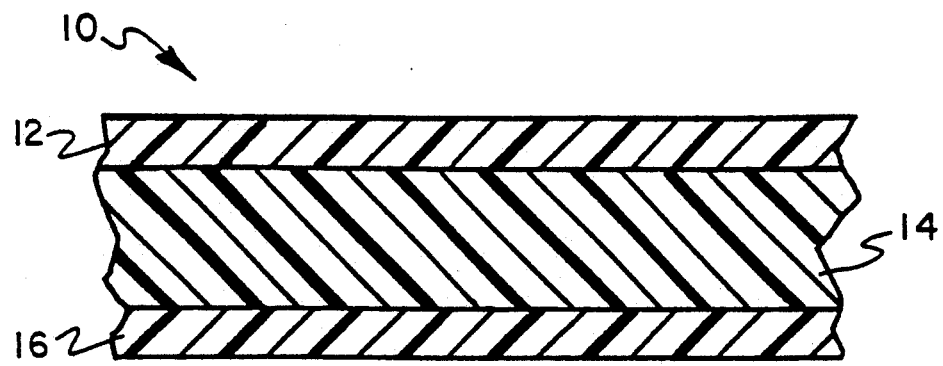
Figure 2:
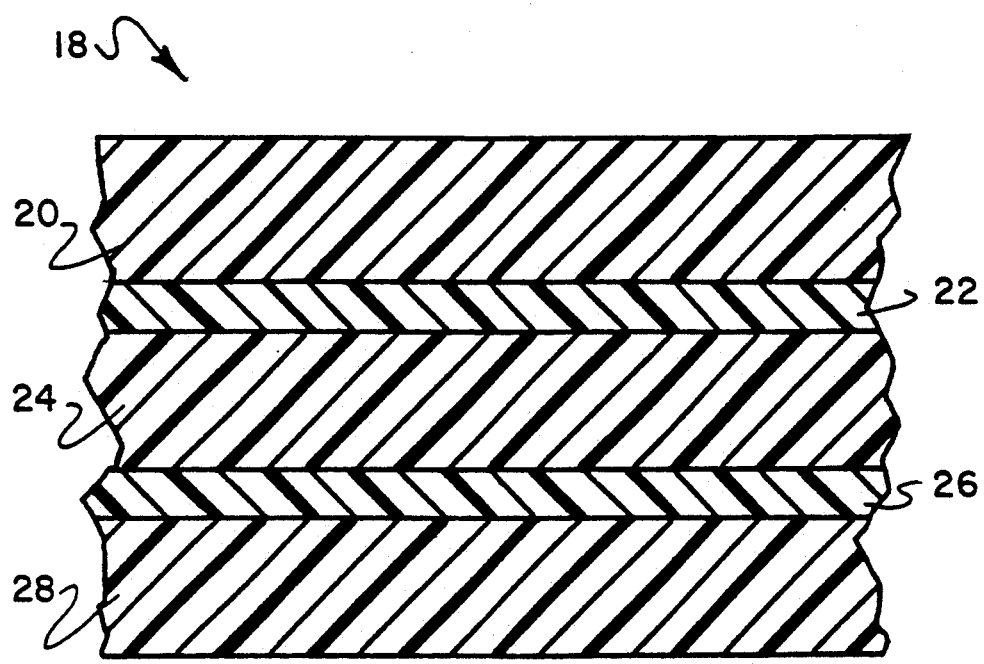

Referring to FIG. I, which is a cross sectional view of a three layered preferred embodiment of the present invention, it is seen that this embodiment 10 comprises core layer 14 and skin layers 12 and 16. The preferred thickness ratio of the three layers of 1/3/1 is demonstrated in FIG. I. A preferred core layer 14 constituent comprises a linear low density polyethylene. However, it is believed that linear medium density polyethylene and other linear ethylene alpha olefins can be substituted as a core layer constituent without substantial alteration of the characteristics of the final film product. The core layer 14 can also comprise propylene homopolymer or copolymer. The propylene homopolymer may be obtained from the Himont under the trade designation PD064.

My experimentation has revealed that an especially preferred core layer formulation comprises linear low density polyethylene. This material may be obtained from the Dow Chemical Company under the tradename Dowlex 2045.

Returning to FIG. I and, in particular, to skin layers 12 and 16, appropriate skin layer formulations can be EPC blended with PB.

Experimentation has also determined that a particularly preferred skin layer formulation comprises a blend of 1% to 30% PB with 70% to 99% EPC, more preferably 10% to 25% PB with 75% to 90% EPC, and most preferably 15% to 20% PB with 80% to 85% EPC.

The ethylene propylene copolymer may be obtained from Fina under the trade designation 8473. The PB may be obtained from Shell under the trade designation 0300 and 8310.

An alternative skin layer comprises PBC, such as that available from Mitsui as Tafmer XR 106L, 107L, and 110L. This material can optionally be blended with propylene polymer or copolymer. Preferred blends include 50% to 90% PP and/or EPC, more preferably 60% to 80% EPC, blended with 10% to 50%, more preferably 20% to 40% PBC.

Throughout this specification and claims all percentages are "by weight" percentages.

Throughout the specification and claims all references to density are in gm/cc.

In summary, my experimentation has determined that a particularly preferred embodiment of the present invention comprises a core layer comprising linear low density polyethylene and skin layers comprising a blend of 10% to 25% of polybutylene with 75% to 90% ethylene propylene copolymer.

Although the above information is directed to three layer formulations, structures having more than three layers, such as various five layer formulations are also satisfactory from a physical characteristics point of view, and can be made with appropriate equipment. In some cases, such materials can actually be more economical to produce than three layer film.

FIG. II is a cross sectional view of a five layer film 18 of the present invention. The core layer 24 may comprise any of the core layer formulations discussed above with regard to the core layer 14 of the three layer embodiment.

The skin layers 20 and 28 of the five layer embodiment may comprise any of the skin layer formulations discussed above with regard to the skin layers 12 and 16 of the three layered embodiment of FIG. I.

The five layered embodiment of FIG. II also includes intermediate layers 22 and 26. These intermediate layers can comprise low ethylene content propylene copolymer, or other polymeric material such as linear EAO which can adequately adhere the skin layers to the core layer. Various polymeric adhesives are available which can function as the intermediate layers.

My experimentation has revealed that a particularly preferred five layer structure will comprise skin layers 20 and 28 which comprise a blend of 75% to 90% of an ethylene propylene copolymer (EPC) and 10% to 25% of a polybutylene; intermediate layers 22 and 26 comprising a low ethylene content propylene copolymer; and a core layer 24 comprising a linear low density polyethylene. The EPC may be obtained from Fina under the trade designation 8473. The PB may be obtained from Shell under the trade designation 0300 and 8310. The LLDPE may be obtained from the Dow Chemical Company under the trade designation Dowlex 2045.

Those skilled in the art will readily recognize that all of the above disclosed, by weight, percentages are subject to slight variation. Additionally, these percentages may vary slightly as a result of the inclusion or application of additives such as the silicone mist discussed below or agents such as slip and anti-block agents.

Additional layers and/or minor amounts of additives may be added to either the 3-layer or 5-layer structure of the present invention as desired.

In the preferred process for making the multilayer film of the present invention the basic steps are blending the polymers for the various layers, coextruding the layers to form a multilayer film, and then optionally stretching the film to biaxially orient. These steps and additional desirable steps will be explained in detail in the paragraphs which follow.

The process begins by blending the raw materials (i.e. polymeric resins) in the proportions and ranges desired as discussed above. The resins are usually purchased from a supplier in pellet form and can be blended in any one of a number of commercially available blenders as is well known in the art. During the blending process any additives and/or agents which are desired to be utilized are also incorporated.

The blended resins and applicable additives and/or agents are then fed into the hoppers of extruders which feed the coextrusion die. For the three-layer film at least three extruders need to be employed if each layer is to have a different composition. Two extruders are fed the materials desirable for the inner and outer skin layers and the other extruder is fed the linear low or linear medium density polyethylene material which is desired for utilization in the core layer. Additional extruders may be employed, if desired. Preferably the materials are coextruded as a tube having a diameter which is dependent on the racking ratio and desired final diameter. This coextruded tube is relatively thick and is referred to as the "tape". Circular coextrusion dies are well known in the art and can be purchased from a number of manufactures. In addition to tubular coextrusion, slot dies could be used to coextrude the material in planar form. Well known single or multilayer extrusion coating processes could also be employed if desired.

An additional process step which may be utilized is to irradiate the tape or unexpanded tubing or sheet by bombarding it with e.g. high-energy electrons from an accelator to cross-link at least part of the tape. Cross-linking greatly increases the structural strength of the film or the force at which the material can be stretched before tearing apart when the film materials are predominately ethylene such as polyethylene or ethylene-vinyl acetate copolymer. Irradiation also improves the optical properties of the film and changes the properties of the film at higher temperatures. If an irradiation step is employed a preferred irradiation dosage level is in the range of 0.5 MR to 12.0 MR. MR is an abbreviation for megarads. A megarad is $1 \times 10^6$ rads with a rad being the quantity of ionizing irradiation that results in the absorption of 100 ergs of energy per gram of irradiated material regardless of the source of the radiation. In some instances, it may be desirable to stretch the multilayer film first and then irradiate it, or, if sequential coating is employed one layer or a group of layers could be irradiated and then another layer or layers could be added before the final step of stretching and orienting.

An additional optional process step is the application of a fine silicon spray to the interior of the newly extruded tape.

Following coextrusion, quenching to cool, and if desired irradiation, the extruded tape is optionally reheated and is continuously inflated by internal air pressure into a bubble thereby transforming the narrow tape with thick walls into a wide film with thin walls of the desired film thickness. This process is sometimes referred to as the "trapped bubble technique" of oriention or as "racking". After stretching, the bubble is then deflated and the film is wound onto semi-finished rolls called "mill rolls". The racking process orients the film, by stretching it transversely and, to some extent, longitudinally to rearrange the molecules and thus impart shrink capabilities to the film and modify the film's physical characteristics. Additional longitudinal or machine direction stretching may be accomplished by revolving the deflate rollers which aid in the collapsing of the "blown bubble" at a speed greater than that of the rolls which serve to transport the reheated "tape" to the racking or blown bubble area. Tenter framing can also be employed. All of these methods of orientation are well known in the art.

The invention may be further understood by reference to the following tables. Table 1 identifies the resins used in the subsequent tables. Table 2 compares various physical properties of the films of Examples 2-5 with a control film of Example 1. The control film is Cryovac's MPD 2055 shrink film. Table 3 has several additional examples of the present inventive film.

Hot slip properties referred to in the Tables are measured subjectively by taking the film to be tested, wrapping it around boxes, and running the boxes through a shrink tunnel. While the material is still warm, the boxes are shifted pass each other, and a value between 1 and 5 is assigned according to the ease with which the boxes slip or shift pass each other. The higher the number, the more slippery the film. The control MPD material, indicated as having a slip of 4 minus in Table 1, is usually in the 2 to 3 range, as shown for example in Table 2.

Cold slip involves the same procedure, but with the film cooling to room temperature before the slip test is made.

The benefit of slip values depends on the end use application. For example, sometimes low cold slip is beneficial, if movement of multiple packages as a unit is desired.

Coefficient of friction (COF) is defined as the ratio of the force required to move or push a film covered sled of 50 grams mass, divided by the weight of the object. COF involves an objective ASTM procedure (ASTM D 1894) wherein a sled is covered with the film to be tested. A track on which the sled will be moved is also covered with the same film. The film is therefore sliding against itself. COF provides a more objective test of slip.

Because it takes more effort to initiate slip than to continue slip (as a result of inertia), a graphic representation of COF values would typically show an initial peak which represents static COF. The continuing curve on such a graph, representing the force needed to continue movement of the film covered sled against the film covered table, is referred to as kinetic COF.

In the Tables, the phrase "in" for the COF values refers to the fact that each of the film samples in contact with each other are positioned so that the surface of the film representing the interior surface of the film during the tubular extrusion from a die is in contact with a like surface on the second film sample.

Conversely, the phrase "out" in the table indicates that exterior surfaces of the film are placed against each other.

Note that Examples 7 and 8 differ in that the film of Example 7 was subjected to a silicone misting step as described above; the film of Example 8 was not.

Also, the skin layers of Examples 6 through 8 included about 1% of slip and antiblock additives; the intermediate layers of Examples 6 through 8 included about ½ percent of slip additives.

The films of Examples 1 to 10 were made by the coextrusion processes described above, including the orientation steps but not including irradiation of the materials.

TABLE 1

| ABBREVIATION | COMMERCIAL NAME | SUPPLIER |
| --- | --- | --- |
| $EPC_1 =$ | FINA 8473 | FINA |
| $MB_1 =$ | (PP-Based Masterbatch) | |
| $LLDPE_1 =$ | DOWLEX 2045 | DOW |
| $PB_1 =$ | SHELL 0300 | SHELL |
| $PB_2 =$ | SHELL 8310 | SHELL |
| $PBC_1 =$ | TAFMER XR 106L | MITSUI |
| $PBC_2 =$ | TAFMER XR 107L | MITSUI |
| $PBC_3 =$ | TAFMER XR 110L | MITSUI |
| $PP_1 =$ | PROFAX PD-064 | HIMONT |

Note: $MB_1$ is a masterbatch having about 90% polypropylene and about 10% antiblock and slip agents.

TABLE 2

| EXAMPLE NO. | (Control) 1 | 2 | 3 | 4 | 5 |
| --- | --- | --- | --- | --- | --- |
| Structure | A/B/A | A/B/A | A/B/A | A/B/A | A/B/A |
| Where A = | 87.5% $EPC_1$ + 12.5% $MB_1$ | 77.5% $EPC_1$ + 12.5% $MB_1$ + 10% $PB_1$ | 67.5% $EPC_1$ + 12.5% $MB_1$ + 20% $PB_1$ | 77.5% $EPC_1$ + 12.5% $MB_1$ + 10% $PB_2$ | 67.5% $EPC_1$ + 12.5% $MB_1$ + 20% $PB_2$ |
| and B = | $LLDPE_1$ | $LLDPE_1$ | $LLDPE_1$ | $LLDPE_1$ | $LLDPE_1$ |
| Layer Ratio | 1/3/1 | 1/3/1/ | 1/3/1 | 1/3/1 | 1/3/1 |
| Lap Seal Strength (lb/in) | 2.9 | 5.0 | 7.5 | 5.4 | 5.7 |
| Hot Slip | 4− | 3 | 2− | 2− | 1 |
| Cold Slip | 3+ | 3+ | 3− | 3− | 2 |
| COF, static/in | 0.335 | 0.367 | 0.315 | 0.254 | 0.254 |
| COF, kinetic/in | 0.256 | 0.355 | 0.445 | 0.398 | 0.745 |
| COF, static/out | 0.354 | 0.275 | 0.314 | 0.293 | 0.378 |
| COF, kinetic/out | 0.229 | 0.396 | 0.424 | 0.363 | 0.369 |

TABLE 3

| EXAMPLE NO. | 6 | 7 | 8 | 9 | 10 |
| --- | --- | --- | --- | --- | --- |
| Structure | A/B/C/B/A | A/B/C/B/A | A/B/C/B/A | A/B/A | A/B/A |
| Where A = | $PBC_1$ + | $PBC_2$ | $PBC_2$ | 67.5% $EPC_1$ + 20% $PBC_3$ + 12.5% $MB_1$ | 47.5% $EPC_1$ + 40% $PBC_3$ + 12.5% $MB_1$ |
| B = | 87.5% $EPC_1$ + 12.5% $PP_1$ | 87.5% $EPC_1$ + 12.5% $PP_1$ | 87.5% $EPC_1$ + 12.5% $PP_1$ | $LLDPE_1$ | $LLDPE_1$ |
| and C = | $LLDPE_1$ | $LLDPE_1$ | $LLDPE_1$ | | |
| Layer Ratio | 1/2/4/2/1 | 1/2/4/2/1 | 1/2/4/2/1 | 1/3/1 | 1/3/1 |
| Lap Seal Strength | 7.6 | 5.3 | 5.3 | 3.6 | 5.8 |

TABLE 3-continued

| EXAMPLE NO. | 6 | 7 | 8 | 9 | 10 |
|---|---|---|---|---|---|
| Hot Slip | 2+ | 1 | 1 | 1 | 1 |
| Cold Slip | 3 | 2 | 3+ | 1 | 2− |
| COF, static/in | 0.278 | 0.41 | 0.636 | 0.383 | 0.43 |
| COF, kinetic/in | 0.17 | 0.203 | 0.237 | 0.253 | 0.267 |
| COF, static/out | 0.289 | 0.371 | 0.35 | 0.355 | 0.36 |
| COF, kinetic/out | 1.88 | 0.185 | 0.186 | 0.241 | 0.221 |

Lap seal strengths indicated in the previous Tables were measured according to an internally developed test method as follows. A standard sized gift box (approximately 10 inches×7 inches×2 inches) is loaded with a piece of plywood about ⅛ inch thick. The wood is added in order to keep the box on the conveyor belt when subjected to the movement of hot air inside the shrink tunnel. Film of the present invention is wrapped around the loaded box, forming a tube. The wrapping is done by means of a Weldotron 1400 wrapper. The film is aligned with respect to the box so that the machine direction of the film corresponds to the longest dimension of the box. After wrapping, the film tube is cut and simultaneously trim sealed using a hot wire. The lapped material is tacked in place along the length of the package using an electrostatic arc. The film is then shrunk around the box in a hot air shrink tunnel, and the heat of shrinking forms the lap seal bond. One inch strips are cut perpendicular to the lap seal, and the strength of this seal is measured with an Instron type tensile strength tester in a conventional manner.

It should be understood that the detailed description and specific examples which indicate the presently preferred embodiments of the invention are given by way of illustration only since various changes and modifications within the spirit and scope of the invention will become apparent to those of ordinary skill in the art upon review of the above detailed description and examples.

In view of the above:

We claim:

1. A multilayer film with improved lap seal strength comprising:

a) a core layer comprising a linear ethylene alpha olefin copolymer; and
   b) two skin layers comprising a polymeric material selected from the group consisting of:
      i) a blend of ethylene propylene copolymer and polybutylene,
      ii) a blend of propylene polymer or copolymer and propylene butene copolymer; and
      iii) propylene butene copolymer.

2. The film of claim 1 wherein the linear ethylene alpha olefin copolymer is selected from the group consisting of:

a) linear medium density polyethylene;
   b) linear low density polyethylene; and
   c) very low density polyethylene.

3. The film of claim 1 wherein the skin layers comprise a blend of 75% to 90% ethylene propylene copolymer and 10% to 25% polybutylene.

4. The film of claim 1 wherein the skin layers comprise a blend of 50% to 90% propylene polymer or copolymer and 10% to 50% propylene butene copolymer.

5. The multilayer film of claim 1, further comprising at least two intermediate layers comprising a polymeric adhesive.

6. The film of claim 5 wherein the polymeric adhesive is a low ethylene content ethylene propylene copolymer or a linear ethylene alpha olefin copolymer.

7. The film of claim 1 wherein the film is oriented in at least one direction.

8. The film of claim 1 wherein at least one layer of the film is cross-linked.

9. A package made from the film of claim 1.

* * * * *